US006892984B2

(12) United States Patent
Wood et al.

(10) Patent No.: US 6,892,984 B2
(45) Date of Patent: May 17, 2005

(54) ATTACHMENT APPARATUS FOR AN INJECTED-MOLDED FRAMED CANOPY

(75) Inventors: Jeffrey H. Wood, Eureka, MO (US); Steven J. Miener, Florissant, MO (US); Terry A. Sewell, Ballwin, MO (US); Anthony Falcone, Renton, WA (US)

(73) Assignee: The Boeing Company, Chicago, IL (US)

( * ) Notice: Subject to any disclaimer, the term of this patent is extended or adjusted under 35 U.S.C. 154(b) by 83 days.

(21) Appl. No.: 10/367,024

(22) Filed: Feb. 13, 2003

(65) Prior Publication Data

US 2004/0159743 A1 Aug. 19, 2004

(51) Int. Cl.[7] ................................................ B64C 1/10
(52) U.S. Cl. ..................................... 244/121; 244/129.4
(58) Field of Search ............................ 244/121, 129.3, 244/129.4, 129.5; 277/934, 931, 646; 403/374.1, 373

(56) References Cited

U.S. PATENT DOCUMENTS

| 451 | A | | 11/1837 | Salsbury, Jr. |
|---|---|---|---|---|
| 2,258,724 | A | | 10/1941 | Wagner et al. |
| 2,511,168 | A | | 6/1950 | Martin et al. |
| 3,618,881 | A | | 11/1971 | Fellers et al. |
| 4,004,388 | A | | 1/1977 | Stefanik |
| 4,580,745 | A | | 4/1986 | Brophy |
| 4,823,229 | A | * | 4/1989 | Waterland III ............... 361/218 |
| 4,964,594 | A | * | 10/1990 | Webb .......................... 244/131 |
| 5,085,383 | A | | 2/1992 | Larkin et al. |
| 5,277,384 | A | * | 1/1994 | Webb ....................... 244/129.3 |

* cited by examiner

*Primary Examiner*—Charles T. Jordan
*Assistant Examiner*—T. Nguyen
(74) *Attorney, Agent, or Firm*—Black Lowe & Graham PLLC

(57) ABSTRACT

A method and system for attaching a canopy to a vehicle, such as an aircraft, is provided. The system includes first and second sections. The first section attaches to the second section with a portion of the canopy being secured between the attached first and second sections. The canopy is molded to conform with the secured first and second sections. In one embodiment, the canopy is molded to include one or more fastener receiving holes with or without bushings. In another embodiment, the first or second sections include one or more channels for receiving an inflatable bladder. The first or second sections are configured to be received by the vehicle.

14 Claims, 6 Drawing Sheets

ATTACHMENT APPARATUS FOR AN INJECTED-MOLDED FRAMED CANOPY

RELATED APPLICATIONS

This invention relations to copending U.S. patent application Ser. No. 10/366,949, filed Feb. 13, 2003, U.S. patent application Ser. No. 10/367,064, filed Feb. 13, 2003, U.S. patent application Ser. No. 10/367,404, filed Feb. 13, 2003, U.S. patent application Ser. No. 10/367,403, filed Feb. 13, 2003, U.S. patent application Ser. No. 10/367,062, filed Feb. 13, 2003, all of which are hereby incorporated by reference.

GOVERNMENT LICENSE RIGHTS

This invention was made with Government support under U.S. Government contract F33615-97-2-3407 awarded by U.S. Air Force. The Government has certain rights in this invention.

FIELD OF THE INVENTION

This invention relates generally to canopies and, more specifically, to attachment mechanisms for vehicle canopies.

BACKGROUND OF THE INVENTION

Modern aircraft canopies contain many parts. A transparent portion of the canopy may be replaced several times during the life of an aircraft due to scratches and general deterioration. Replacement of the transparent portion entails frame disassembly and reassembly. This is time-consuming, labor intensive, and costly.

Attempts have been made to produce frameless aircraft canopies in order to simplify replacement of the transparent portion, among other reasons. However, viable frameless canopy system must include a method for latching. As is known, the frame provides structural stiffness and strong, secure, attachment points for hinges and latches. Prior latching methods include a male hook or pin located on the aircraft structure or canopy frame and a female receiver on the canopy frame structure or aircraft structure respectively. Such discrete latching methods produce concentrated loads, which cause bearing stress in the transparency in the region of the latch.

Stress causes problems for transparencies. Glassy polymers craze at low stress levels. The effect of crazing on crack growth and localized failure is not well understood. Polymer transparencies yield at low stress levels and creep occurs after a fraction of service life. Cyclic, long-term loading, such as cockpit pressurization, induces creep and/or craze and reduces service life. Elevated temperatures, such as those experienced by high-speed aircraft, further increase the rate of creep and amplify the effect of crazing.

Therefore, there exists an unmet need to produce a latching system for an injection-molded canopy which avoids plastic creep and crazing due to concentrated loads yet securely holds the canopy in place.

SUMMARY OF THE INVENTION

The present invention is an attachment system for an injection-molded canopy.

The present invention provides a method and system for attaching a canopy to a vehicle, such as an aircraft. The system includes first and second sections. The first section attaches to the second section with a portion of the canopy being secured between the attached first and second sections. The canopy is molded to conform with the secured first and second sections.

In one aspect of the invention, the canopy is molded to include one or more fastener receiving holes with or without bushings.

In another aspect of the invention, the canopy is molded to include one or more channels for receiving an inflatable bladder.

In still another aspect of the invention, the first or second sections include one or more channels for receiving an inflatable bladder for pressure sealing.

In yet another aspect of the invention, at least one of the first or second sections are configured to be received by the vehicle.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
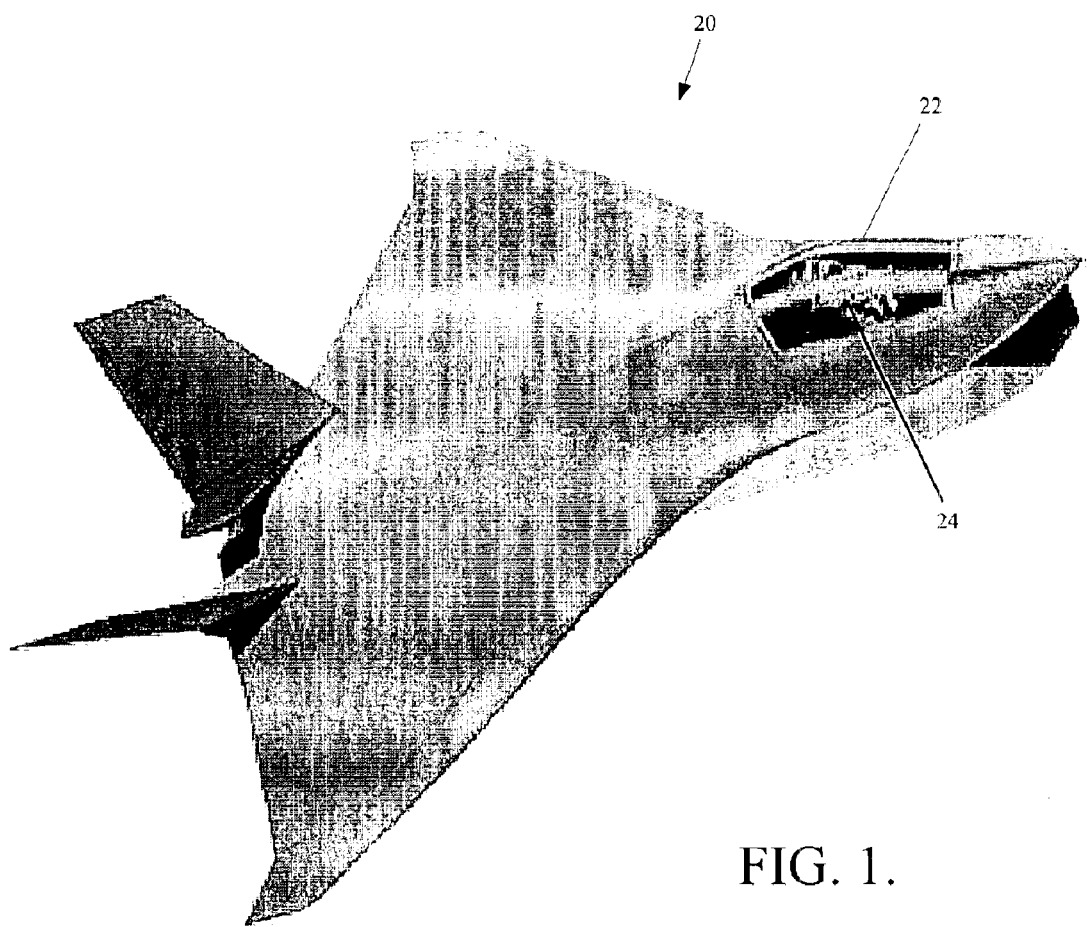
FIG. 1 illustrates a perspective view of an aircraft implementing a canopy closure system formed in accordance with the present invention.

The present invention is a method and system for attaching a canopy to a vehicle, such as an aircraft. FIG. 1 illustrates a perspective view of an aircraft 20 that uses a framed canopy 22, such as without limitation a polycarbonate or acrylic canopy, that surrounds a cockpit 24 of the aircraft 20. The canopy 22 is suitably an injected-molded framed canopy that is molded for attaching a frame. The frame connects and disconnects to the aircraft 20 around a rim of the cockpit 24 for normal flight operations and normal ingress and egress by a pilot.

Figure 2:
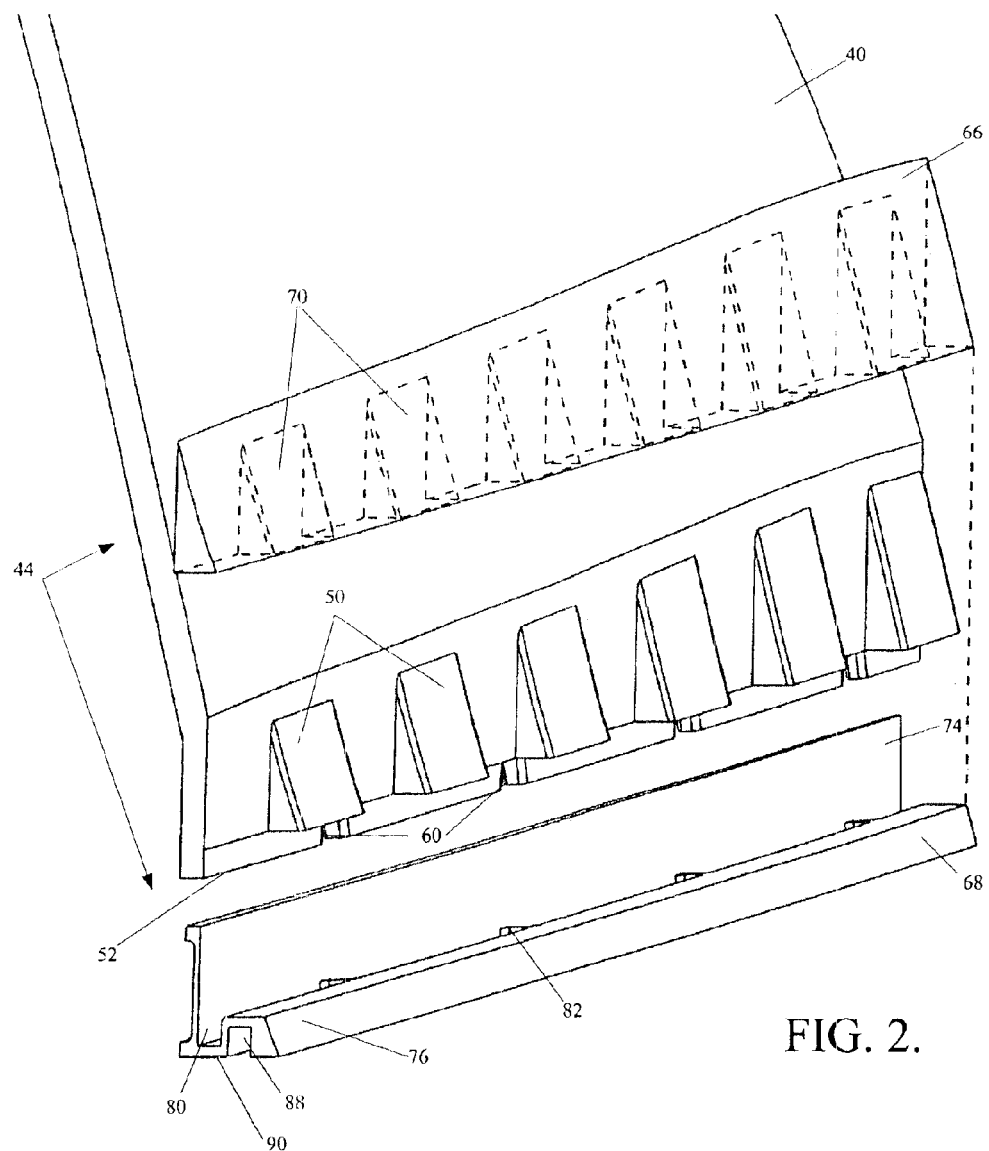
FIG. 2 illustrates a perspective view of a canopy attachment system formed in accordance with a first embodiment of the present invention.

FIG. 2 illustrates a perspective view of a canopy frame system 44 having a canopy 40 that is molded to receive a frame system 44. The canopy 40 is molded to include equally spaced-apart wedges 50 that are thickest at a predefined height above a bottom edge 52 of the canopy 40. The wedges 50 taper to meet the outer surface of the canopy 40 at a predefined distance from the bottom edge 52.

The bottom edge 52 of the canopy 40 includes one or more slots 60. The slots 60 are separated by a predefined distance along the bottom edge 52. The slots 60 extend some predefined distance into the canopy 40. The distances are determined relative to the frame system 44.

The canopy frame system 44 includes a first section 66 and a second section 68. The first section 66 includes wedge-shaped cavities 70 that are shaped to receive the wedges 50 of the canopy 40. The second section 68 includes an interior section 74 and an exterior section 76 that form a canopy receiving channel 80. Perpendicular to a longitudinal axis of the channel 80 are one or more securing walls 82 spaced apart to be received by the slots 60.

The canopy frame system 44 is formed by inserting the canopy 40 into the second section 68. The channel 80 receives a portion of the canopy 40 below the wedges 50. The receiving slots 60 receive corresponding securing walls 82, thereby avoiding motion of the second section 68 relative to the canopy 40. The first section 66 is then slid into position over the wedges 50 of the canopy 40, thereby coming in contact with the second section 68. The second section 68 is then fastened to the first section 66 using fasteners (not shown) installed through channel 80 into solid material in first section 66 between the wedge-shaped cavities 70. The canopy 40, the first section 66, and the second section 68 are shaped such that when the first section 66 is properly mated and fastened to the second section 68 with the canopy 40 inserted therebetween, a smooth outer surface is present between the outer surfaces of the canopy 40, the first section 66, and the second section 68.

The exterior section 76 includes a channel 88 that is open at a base edge 90 of the second section 68. The opening of the channel 88 is 180° opposite the opening of the channel 80. The channel 88 and the base edge 90 of the second section 68 are configured to be received by canopy securing mechanisms (not shown) that are included around an edge of an aircraft cockpit. Examples of canopy securing mechanisms are those used in conventional military aircraft, such as the F-16 and F/A-18. It can be appreciated that the canopy can be molded with other shapes that are secured within frame components.

Figure 3:
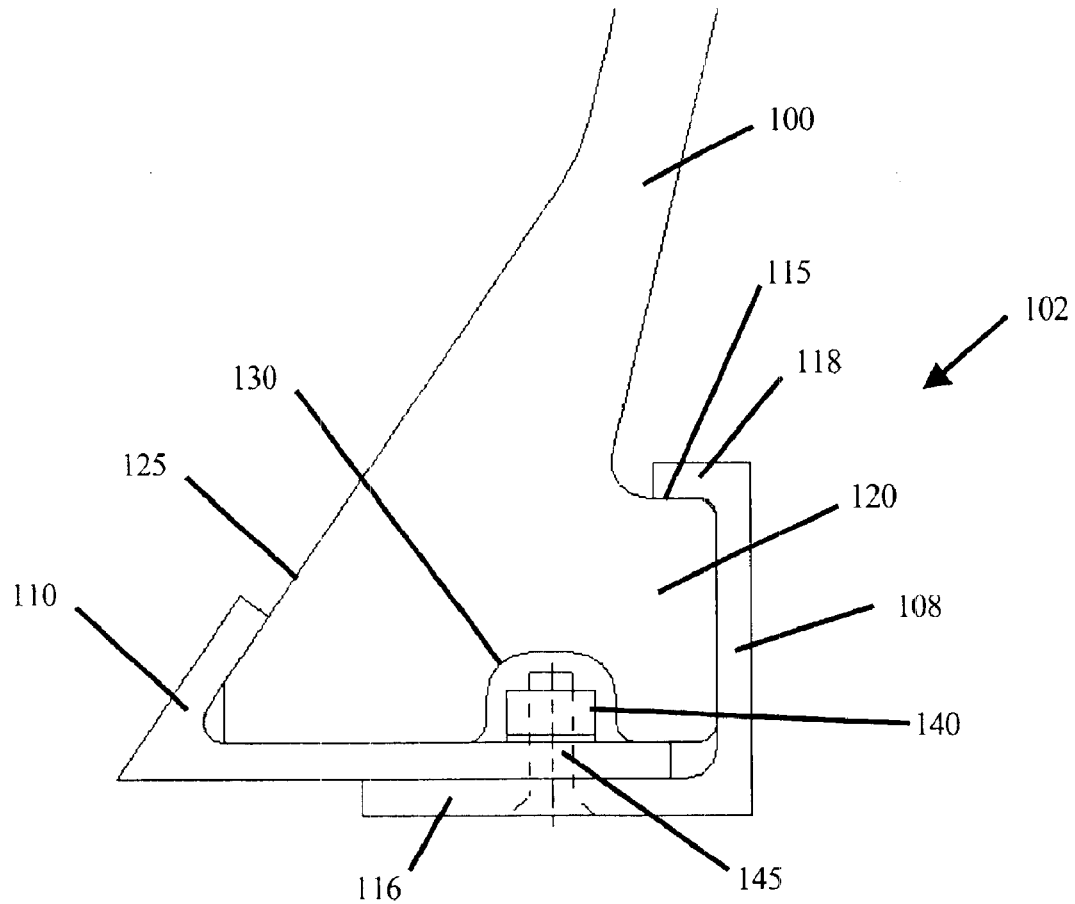
FIG. 3 illustrates a cutaway view of a second embodiment of a canopy attachment system formed in accordance with the present invention.

FIG. 3 illustrates another embodiment of a framed canopy 100 attached to a canopy frame structure 102. The frame structure 102 includes a first securing arm 110 and a second securing arm 108. The first securing arm 110 has a closed angle L-shaped cross-section and includes a row of floating plate nuts 140 mounted to an upper surface of the arm 110. The second securing arm 108 includes a squared, U-shaped cross-section with end walls 116 and 118. The second securing arm 108 is attached to securing arm 110 with a row of bolts 145 that pass through an opening in both arms 108 and 110 and are received by the nuts 140.

The canopy 100 includes a thickened base 120 around the periphery of the canopy 100. The thickened base 120 includes a step 115 along the inboard surface for receiving a part of the second securing arm 108. The outboard shape of the canopy 100 provides a locking surface 125 that receives the first securing arm 110. A groove 130 along the bottom surface of the base of the canopy 100 provides clearance for plate nuts 140 and bolts 145 that attach the second locking arm 108 to the first locking arm 110. A form-in-place seal (not shown) is used on the surfaces of the base 120 that bear-up with the second locking arm 108 to the first locking arm 110.

The canopy frame structure 102 is secured to aircraft structure by a canopy locking mechanism (not shown). The canopy securing mechanism suitably includes multiple latches around the edge of the aircraft cockpit.

Figure 4:
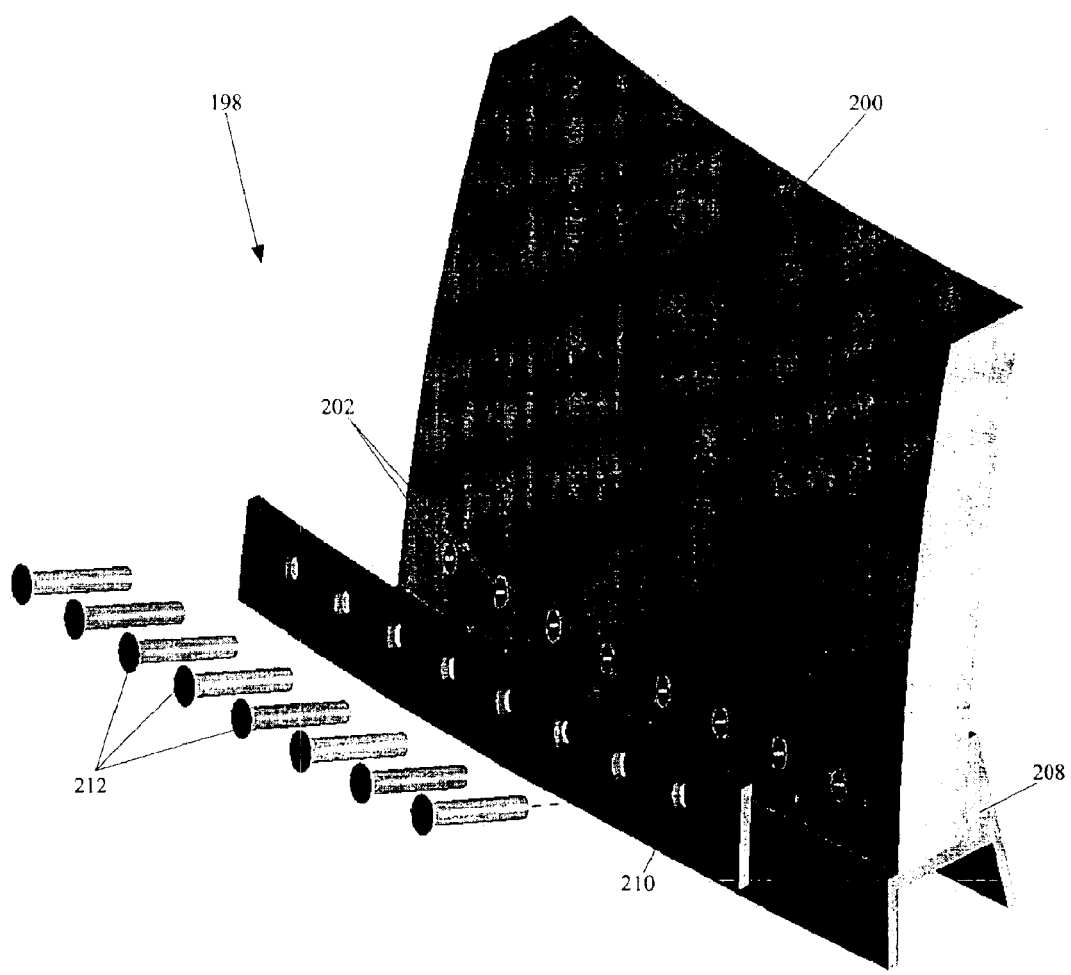
FIG. 4 illustrates a perspective view of a third embodiment of a canopy attachment system formed in accordance with the present invention.

FIG. 4 illustrates a perspective view of a canopy frame system 198 formed in accordance with an alternate embodiment of the present invention. The canopy frame system 198 includes a canopy 200 that is injection molded to include fastener holes 202 at a predefined height above a base edge of the canopy 200. The system 198 also includes a canopy frame section 208, a head plate 210, and a plurality of fasteners 212. The fasteners 212 mount through the head plate 210 and the fastener holes 202 and are received by the frame section 208. The canopy frame section 208 includes components for attaching the canopy frame section 208 in a conventional manner to a cockpit rail or sill.

Figure 5:
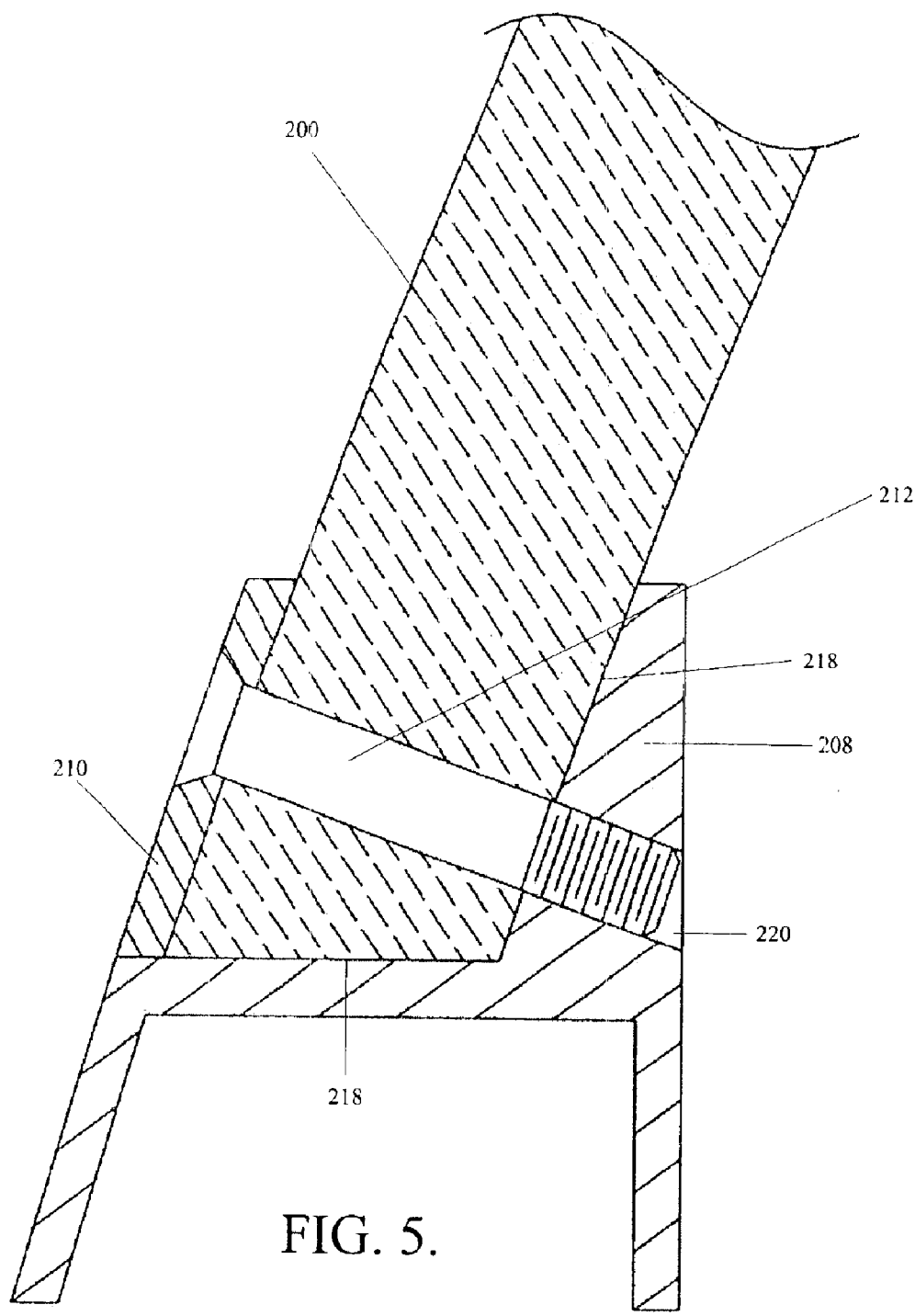
FIGS. 5 and 6 illustrate cutaways views of two alternate embodiments of the canopy system shown in FIG. 4.

FIG. 5 illustrates a cross-sectional view of an embodiment of the system 198 shown in FIG. 4. The frame section 208 includes a slanted seat 218 that receives the base edge and a portion of an inside edge of the canopy 200. The frame section 208 includes threaded receiving holes 220 within a vertical portion of the slanted seat 218. The head plate 210 includes holes for receiving the fasteners 212, such that heads of the fasteners 212 become flush with an outer surface of the head plate 210. The fasteners 212 pass through the head plate 210, the fastener holes 202, and into respective threaded receiving holes 220. The fasteners 212 securely mate the head plate 210 and frame section 208 to the canopy 200.

Figure 6:
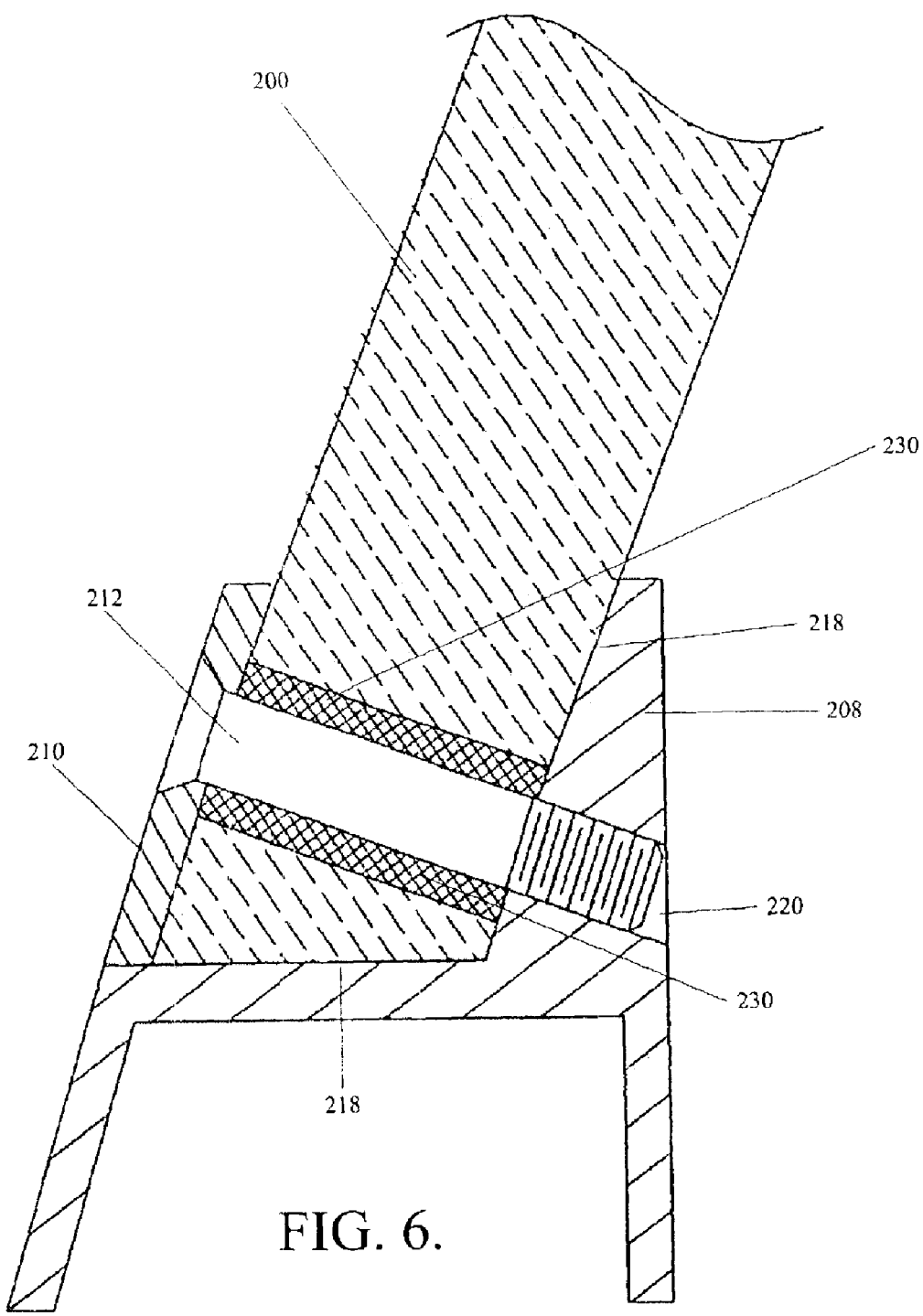

FIG. 6 illustrates a cross-sectional view of another embodiment of the system 198 shown in FIG. 4. As shown in FIG. 6, the injected molded holes 202 include bushings 230 that protect the canopy 200 from the fasteners 212. The bushings 230 are made of a material, such as a polymer or a metallic, for protecting the canopy 200 from the fasteners 212. The bushings 230 are either included in the injection mold that forms the canopy 200 or the bushings 230 are inserted into the holes 202 after the canopy 200 has completed the molding process. Soft polymer bushings can aid in compensating for differentials in thermal expansion in the dissimilar-material assembly.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A canopy system for a vehicle, the system comprising:

an injection-molded canopy;

a first frame section; and a second frame section; and one or more fasteners for attaching the first section to the second section with a portion of the canopy being secured between the attached first and second sections;

wherein the portion of the canopy secured between the sections includes one or more protrusions and at least one of the frame sections include one or more receiving portions for receiving the one or more protrusions for inhibiting longitudinal movement of the canopy with respect to the sections.

2. The system of claim 1, wherein the canopy is molded to conform with the first and second sections.

3. The system of claim 1, wherein the canopy is molded to include one or more fastener receiving holes.

4. A method for attaching an injection-molded canopy to a vehicle, the method comprising:

molding a portion of the canopy to include one or more protrusions;

attaching a first frame component to the second frame component;

wherein at least a portion of the molded portion of the canopy is secured between the attached first and second canopy frame components and one of the frame components includes one or more portions for receiving the one or more protrusions for inhibiting longitudinal movement of the canopy relative to the frame components.

5. The method of claim 4, wherein the molded portion includes one or more fastener receiving holes.

6. The method of claim 4, wherein the one of the first or second frame components include one or more channels for receiving a pressure seal.

7. The method of claim 4, wherein at least one of the first or second frame components are configured to be received by the vehicle.

8. The method of claim 4, wherein the vehicle is an aircraft.

9. The system of claim 1, wherein the one or more protrusions include one or more triangular-shaped volumes.

10. The system of claim 9, wherein the one or more receiving portions include a triangular-shaped cavity sized to receive a corresponding one of the one or more triangular-shaped volumes.

11. The system of claim 10, wherein at least one of the frame sections include one or more flanges and a base edge of the canopy includes one or more notches for receiving a corresponding flange for inhibiting longitudinal movement of the canopy with respect to the frame sections beyond a threshold amount.

12. The system of claim 1, wherein the one or more protrusions extends between a forward portion and a rear portion of the canopy and one of the frame sections includes a portion for inhibiting vertical movement of the canopy with respect to the frame sections beyond a threshold amount.

13. A canopy system for a vehicle, the system comprising:
an injection-molded canopy;
a first frame section; and
a second frame section; and
one or more fasteners for attaching the first section to the second section with a portion of the canopy being secured between the attached first and second sections;
wherein the portion of the canopy secured between the sections includes one or more protruding flanges and at least one of the frame sections include one or more receiving portions for receiving the one or more protruding flanges and inhibiting vertical movement of the canopy with respect to the sections.

14. A method for attaching an injection-molded canopy to a vehicle, the method comprising:
molding a portion of the canopy to include one or more protrusions;
attaching a first frame component to the second frame component;
wherein at least a portion of the molded portion of the canopy is secured between the attached first and second canopy frame components and one of the frame components includes one or more portions for receiving the one or more protrusions for inhibiting vertical movement of the canopy relative to the frame components.

* * * * *